Patented Mar. 24, 1942

2,277,062

UNITED STATES PATENT OFFICE 2,277,062

LEAD ALUMINATE PIGMENT AND PAINT AND METHOD OF MAKING SAME

Louis E. Barton, Windsor, Conn.

No Drawing. Application April 25, 1939,
Serial No. 270,012

13 Claims. (Cl. 23—52)

In my co-pending application for patent, Serial Number 270,013, filed April 25, 1939, the preparation of lead aluminate pigments is particularly described and discussed. My process of making lead aluminate pigments there described, in brief, consists in making a mixture of such lead and aluminum compounds as will, when heated, supply to the product only lead and aluminum oxides and then heating the mixture in the temperature range about 725 to 880° C. until the oxides of lead and aluminum chemically combine by reaction in the solid phase.

My invention relates generally to pigments, their preparation and application and more specifically to a new and improved type of white pigments—the aluminates of lead—together with improved methods of making them and their application in paints.

In my co-pending United States patent application U. S. Serial No. 41,867, filed September 24, 1935, I have described a method of making white aluminates of certain metallic elements which briefly consists in heating a properly prepared mixture containing an oxide of the metallic element and the oxide of aluminum to a temperature sufficiently high to form the aluminate but without fusion of the charge.

Some of the white aluminate pigments so prepared are stable and all have physical properties which make them suitable for use in paints and for other applications where white pigments are required; but I have discovered that in the case of lead aluminate pigments the degree of stability is influenced by the nature and quality of materials used, the kind of aluminum oxide, or aluminum oxide containing compound, and on the method of preparing the aluminum oxide as well as upon the process of making the aluminate pigment. It is one of the objects of my invention to provide an improved method of making lead aluminates whereby the degree of stability of the product is controlled to impart the desired properties.

The instability of lead aluminate pigments results in a hydration of the pigment when subjected to the action of water, the action being accelerated at higher temperatures. With the more unstable lead aluminates the hydration is excessive and is accompanied by the development of a brown or gray color so that the degree of instability of that class may be roughly determined by noting the time required for noticeable color change: however, the degree of instability is best judged by determining the amount of hydration that results from subjecting the pigment to the action of water for a given time. I have furthermore found that lead aluminate pigments prepared as described in my co-pending patent application referred to, may, after long storage, acquire a brownish color indicative of the instability of the pigment.

If anhydrous alumina, $Al_2O_3$, having the so-called alpha structure is used in making the lead aluminate the product will be perfectly stable but in that case, if the aluminum oxide has been prepared by calcining at a high temperature, the reaction between the lead and aluminum oxides takes place very slowly, making the process more expensive if not impracticable. The product is liable also to be of poorer color or relatively less white, or even a distinctly colored product.

If aluminum hydrate, or aluminum oxide which has been prepared by calcining aluminum hydrate at temperatures below 1000° C., is used in making the lead aluminate, the reaction between the lead and aluminum oxides will proceed rapidly to completion yielding a white product, but one which is relatively less stable. Such a product is indeed sufficiently stable to be wet-milled and dried as described in my pending application Serial No. 41,867, but the production of a perfectly stable lead aluminate pigment has distinct advantages over the less stable product.

As a product stable lead aluminate has the advantage in various applications in the arts, many of which require water or aqueous solutions or involve the use of water in preparation of the product, that there is no danger of excessive hydration or possible discoloration. In the process of manufacturing lead aluminates the stable products have the distinct advantage that they may be handled in continuous systems of wet-milling and classification which may subject the pigment to the action of water for many days. It is permissible also to use higher temperatures in drying the wet-milled product.

In making lead aluminate, as described in my pending application Serial No. 41,867, the upper limit of temperature range is but little above 850° C.; hence if the so-called gamma aluminum oxide, $Al_2O_3$, is used, or if aluminum hydrate, which is changed by heating to temperatures even below 850° C. to the gamma structure of aluminum oxide, is used, the lead aluminate pigment will be relatively unstable. I have found that the stability of such a product can be improved by longer calcining within the permissible temperature range, and to some extent by using alumina having finer particle size, but such procedures increase the cost of production and the product is not then stabilized to all conditions to which it may be subjected.

In my co-pending application for patent Serial 264,583 filed March 28, 1939, I have disclosed a process of stabilizing lead aluminate pigments against discoloration either in the presence of water or when exposed to atmospheric conditions, which consists in thoroughly washing the lead aluminate thereby substantially eliminating water-soluble impurities and forming a product containing a material content of combined water. The present application relates to a process of stabilizing whereby it is unnecessary to wash the lead aluminate pigment after its formation, though the product may be hydrated by treating it with water as will be described later.

In my co-pending United States patent application Serial Number 117,341, filed December 23, 1936, of which this application is a continuation-in-part, I disclosed a process of making stable lead aluminate pigments which briefly described consists in pre-calcining the alumina at temperatures above 900° C., mixing the alumina so prepared with lead oxide in proportion to yield lead aluminate and finally calcining the mixture to form lead aluminate in the solid phase without fusion. It was stated in the application referred to that in addition to the lead aluminate pigments of regular molecular formula, there shown in detail, others of any desired composition could be prepared. It was also stated that lead aluminate pigments can be prepared at temperatures lower than the "safe temperature range" specified. It is the object of this application not only to show the working of my process in preparing stable lead aluminates of regular molecular formula but also to show how the stabilizing process applies to lead aluminates of other compositions and to lead aluminates made at the lower temperatures referred to as well as those made in the stated "safe temperature range."

I have discovered that if the aluminum hydrate or other aluminum compound which, upon heating, yields only aluminum oxide is first calcined at a temperature of 900° C. or higher and then used to make the lead aluminate the stability of the pigment is greatly improved both in respect to discoloration when kept under normal atmospheric conditions and to discoloration when subjected to the action of water. The degree of stability increases with the time and temperature at which the alumina is pre-calcined, while the amount of hydration which takes place upon treatment of the lead aluminate with water decreases. The increase in stability of the lead aluminate pigment I attribute to a more or less complete conversion of the alumina to the alpha structure during the precalcination. The change from gamma to alpha structure of the alumina probably starts at a temperature of about 900° C. and the conversion is apparently rapid and more nearly complete at 1200° C.

I prefer, when making the product within the preferred range 800 to 850° C., to precalcine the alumina at 1200° C. to 1300° C. when making the normal lead aluminate and at 1150° C. to 1250° C. when making basic lead aluminate. When making the lead aluminate at temperatures lower than 800° C. I prefer to pre-calcine the alumina in the temperature range 900 to 1100° C. I have discovered that within these temperature ranges alumina may be prepared which when used to make lead aluminate will combine readily with the lead compound to make a white pigment of satisfactory stability. Pre-calcination temperatures of the alumina higher than the ranges indicated may be employed but in that case, while the resulting lead aluminate will be stable, longer heating with the lead compound will be required and it will be increasingly difficult to make a pure white product.

The effect of pre-calcination of the aluminum hydrate on the properties and stability of normal lead aluminates made therefrom is shown in the following table. In making the products, equimolecular quantities of lead oxide (PbO) and alumina in the condition shown in column 2 of the tabulation, were blended by milling and then calcined at the temperature shown in column 3.

| Example No. | Alumina pre-calcined, ° C. | Lead aluminate calcined °C. and time, hrs. | Color of product | Time treated with water, hours | Color after treatment | Hydration, after treatment, percent |
|---|---|---|---|---|---|---|
| 1 | Not precalcined | 840, 2 hrs | White | 48 | Brown | |
| | | | | 168 | Gray | 12.08 |
| 2 | do | 820, 2 hrs | do | 48 | Dark gray | 11.22 |
| 3 | do | 700, 96 hrs | Brown cream | 48 | Gray | 7.30 |
| 4 | do | 830, 18 hrs | White | 36 | Gray | |
| | | | | 84 | do | 6.28 |
| 5 | 900 | 840, 2 hrs | do | 96 | Slightly gray | 5.12 |
| 6 | 1,030 | 740, 7 hrs | do | 168 | do | 5.02 |
| 7 | 1,050 | 840, 2 hrs | do | 96 | do | 4.90 |
| 8 | 1,150 | 830, 5 hrs | do | 84 | Very slightly gray | 3.67 |
| 9 | 1,200 | 840, 5 hrs | do | 240 | White | 3.44 |
| 10 | 1,250 | 840, 5 hrs | do | 240 | do | 3.28 |
| 11 | 1,300 | 840, 5 hrs | Cream white | 240 | Cream white | 3.28 |
| 12 | 1,350 | 840, 5 hrs | Slightly yellow | 240 | Slightly yellow | 1.74 |
| 13 | 1,400 | 840, 5 hrs | Distinctly yellow | 240 | Distinctly yellow | 1.30 |

From the results in the foregoing table it will be seen that those products made with alumina which had not been pre-calcined (aluminum hydroxide used) hydrated excessively during the treatment with water and discoloration of the product resulted after a comparatively short period of time. The products made with alumina pre-calcined in a temperature range 900 to 1050° C. show a slight gray color after long treatment with water but are nevertheless greatly improved. Such products before treatment with water are white pigments sufficiently stable for most applications either in anhydrous condition or after wet-milling but with exposure to water for a shorter period of time. Products made with alumina pre-calcined at higher temperatures show perfect or substantially perfect stability.

While, as before stated and as shown in the preceding table, it is difficult to make a white lead aluminate pigment when using alumina calcined above 1300° C., I have found such a white product can be made if the time of heating is sufficiently prolonged. For example, a portion of the mixture used in Example 13 with alumina calcined at 1400° C. was calcined for a period of 80 hours, yielding a cream white product of satisfactory color.

I have furthermore discovered that an improved lead aluminate pigment can be made by controlled hydration of the product after calcination to produce a material content of combined water. The control of hydration is accomplished by selection of the temperature range for pre-calcining the alumina and regulation of the time during which the lead aluminate is subjected to the action of water as in the wet-milling and classification steps. However, as will be seen from the foregoing table, the hydration is not necessarily proportional to the time treated with water but apparently depends also on the quality and condition of materials and their treatment in process; therefore for any stock of materials and combination of factors the time treated with water would be varied as determined by trial to give the degree of hydration desired. The percentages of combined water shown in the foregoing table indicate the hydration of the pigments after many hours' treatment with water, but for any degree of stability indicated a shorter treatment with water would have shown less hydration. This will be clearly apparent from the examples to be given later.

I prefer to hydrate the lead aluminate to the extent of 0.25 to 2.00% of combined water, for, while for some purposes anhydrous pigment or pigment hydrated to a greater extent may be desired and can be made as indicated in the foregoing table, I have found that lead aluminate pigments hydrated as indicated are, as compared with anhydrous products of better hiding power and greatly improved in dispersion properties and wetability with vehicles, such as linseed oil. When mixed and ground the pigment and vehicle readily combine to form a smooth paste, which upon further dilution with the vehicle forms a paint of creamy consistency that works easily under the brush and spreads to an even film in which the dispersion of pigment particles is remarkably uniform.

A study of my various lead aluminate pigments by examination of their X-ray diffraction patterns shows definite distinctions in the products and while, thus far, such distinctions have not been translated to definite structure, it is clear that, in the case of normal lead aluminates, the product made from alpha aluminum oxide (the alumina calcined at temperatures above 900° C.) is different from that made from gamma aluminum oxide.

By my improved process I can make normal and basic lead aluminate, $PbAl_2O_4$ and $Pb_2Al_2O_5$, or lead aluminates of intermediate basicity such as $Pb_3Al_4O_9$, or I can prepare by my methods aluminates of any desired composition, or containing an excess of either alumina or the basic element; the various aluminates, basic, sub-basic, normal and subnormal adjusting during the heating process proportionally in the product in accordance with natural laws to the state of most stable equilibrium. In case either the aluminum or the basic element is in large excess, it is conceivable that the product would contain some of that oxide in solid solution or possibly some free oxide though the product would still consist preponderantly of lead aluminate.

By the expressions normal lead aluminate, sub-normal lead aluminate and basic lead aluminate, as used in the specification and claims, I mean: (1) normal lead aluminate, a product having an equimolecular ratio of PbO to $Al_2O_3$; (2) sub-normal lead aluminate, a product having a ratio of PbO to $Al_2O_3$ less than equimolecular, and (3) basic lead aluminate, a product having a ratio of PbO to $Al_2O_3$ greater than equimolecular.

Before giving specific examples of my invention, I will first give a general description of my improved methods covering certain features which are common in the preparation of all my lead aluminate pigments.

As a source of aluminum oxide, I may use alumina ($Al_2O_3$) or any aluminum compound which upon heating yields aluminum oxide, such as aluminum hydrate or aluminum nitrate, but I prefer to use aluminum hydrate which can be pre-calcined under controlled conditions to impart the desired stability to the lead aluminate. As a source of lead oxide, I may use the oxide as such, or any compound of lead that will yield the required oxide upon heating. For example, in the preparation of lead aluminate I may use either litharge (PbO), or red lead ($Pb_3O_4$), or lead peroxide ($PbO_2$), or white lead ($2PbCO_3.PbH_2O_2$).

The aluminum oxide is prepared for use by calcining it at a temperature above 900° C., preferably, as before stated, within a temperature range of 1000° C. to 1300° C. The alumina can be calcined in any suitable furnace either of the batch type, such as a hearth or Bruckner furnace, or continuous type such as a rotary kiln. The furnace may be electrically heated or fuel fired. Heated gases contacting the charge should be free from dust which might contaminate the charge with discoloring elements such as iron. A fire brick lining is satisfactory.

The alumina thus prepared I then thoroughly mix with the lead compound in the required proportions either by dry-milling, or, preferably, by wet-milling, thereby reducing particle size and also assuring a very close association of the ingredients. The milling may be done either in a batch or a continuous type of mill; in either case by using a porcelain or silex lining to avoid contamination of materials.

The slurry from the wet-mill is dewatered as by settling and decantation and/or filtration. Any suitable equipment may be used, such as Dorr tanks and filter presses.

The wet pulp is then charged directly into the heating furnace, or it may be preliminarily dried and then charged into the furnace. The furnace may be either of the batch type such as a muffle, hearth furnace or Bruckner furnace, or of the continuous kiln type. In either case a lining of high-grade fire brick is satisfactory to avoid contamination of materials. Whatever the type of furnace, means should be provided for close control of temperature as the upper limit of temperature range for lead aluminates is but little below the fusion point of lead oxide and lead aluminate. In furnaces where products of combustion contact the charge a neutral or oxidizing flame should be maintained to avoid possible reduction of metallic oxide.

The time required in the calcining zone depends upon the temperature. The higher the temperature within the permissible range, the shorter the time. However, there is tendency to clearer color tones at the lower and medium temperatures within the preferred range. The time required at various temperatures will be indicated later in the examples of operation.

White lead aluminate pigments can be made in the temperature range 725° C. to 900° C. though prolonged heating is required at 725° C. and the higher temperature, 900° C., is so near to the fusion point that very close temperature control is required. A temperature range of 750 to 850° C. is satisfactory but for greatest economy I prefer a temperature range of 800 to 850° C. The progress of the reaction during calcining may be readily judged by withdrawing a small sample from the furnace for observation. The lead aluminates will be colored when the reaction is incomplete, but will be substantially white in either hot or cold condition when the reaction is complete.

Some of the lead aluminates are sufficiently fine, as discharged from the calcining furnace, if care has been used not to exceed the upper limit of the calcining temperature range, to be used as pigments for paints, but usually milling is required to break down aggregates and also to reduce particle size.

Either dry or wet-milling methods may be used with or without air separation or wet classification respectively, thereby assuring uniformity of product. If wet-milling has been employed, the slurry is dewatered, dried, and if necessary passed through a disintegrator to break down lumps and aggregates.

The following examples are given as illustrative of the operative procedures I use and of the characteristics of some of the products, but should not be regarded as limiting the broad application of my improved methods.

EXAMPLE 1.—*Normal lead aluminate $PbAl_2O_4$*

78 parts of aluminum oxide, $Al_2O_3$, which had been prepared by pre-calcining aluminum hydrate for 2 hours at 1200° C., and 171 parts of lead oxide (litharge) were wet-milled together and the slurry dewatered and dried. The mixture was calcined at 830 to 850° C. for 2 hours. The calcined pigment was then wet-milled for 1 hour, allowed to stand for 11 hours, and dried at 90° C. to 100° C. The finished pigment showed a loss upon calcination (de-hydration) of 0.45% and hence had a chemical composition:

| | Per cent |
|---|---|
| Lead oxide | 68.30 |
| Aluminum oxide | 31.25 |
| Combined water | .45 |

Specific gravity, 5.90.
Oil absorption 16 parts oil per 100 parts pigment.
Hiding power 115 compared with white lead taken as 100.

EXAMPLE 2.—*Basic lead aluminate, $Pb_3Al_4O_9$*

58 parts of aluminum oxide, $Al_2O_3$, which had been prepared by pre-calcining aluminum hydrate for 2 hours at 1200° C., and 192 parts of lead oxide (litharge) were wet-milled together and the slurry dewatered and dried. The mixture was calcined for 2 hours at 820 to 840° C. The calcined product was then wet-milled for 1 hour, allowed to stand for 11 hours and dried at 90 to 100° C. The finished pigment showed a loss upon calcination (de-hydration) of .94% and hence had the chemical composition:

| | Per cent |
|---|---|
| Lead oxide | 75.86 |
| Aluminum oxide | 23.20 |
| Combined water | .94 |

Specific gravity, 6.25.
Oil absorption 14 parts of oil per 100 parts pigment.
Hiding power 120 compared with white lead taken as 100.

EXAMPLE 3.—*Basic lead aluminate $Pb_2Al_2O_5$*

56 parts of aluminum oxide, $Al_2O_3$, which had been prepared by pre-calcining aluminum hydrate for 2 hours at 1150° C., and 244 parts of lead oxide (litharge) were wet-milled together and the slurry dewatered and dried. The mixture was calcined for 2 hours at 810 to 830° C. The calcined product was then wet-milled for 1 hour, allowed to stand for 11 hours and dried at 90 to 100° C. The finished pigment showed a loss upon calcination (de-hydration) of 1.08% and hence had the chemical composition:

| | Per cent |
|---|---|
| Lead oxide | 80.53 |
| Aluminum oxide | 18.40 |
| Combined water | 1.07 |

Specific gravity, 6.73.
Oil absorption 13 parts oil per 100 parts pigment.
Hiding power 135 compared with white lead taken as 100.

EXAMPLE 4.—*Normal lead aluminate, $PbAl_2O_4$*

31.4 parts of aluminum oxide, $Al_2O_3$, which had been prepared by pre-calcining aluminum hydrate for 2 hours at 1030° C., and 68.6 parts of lead oxide, PbO, were wet-milled together for 3 hours and the slurry then dewatered and dried. The mixture was then calcined for 7 hours at a temperature of 740° C. The calcined pigment was then wet-milled for 1 hour, the slurry allowed to stand for 11 hours and finally dewatered and dried at a temperature of 90 to 100° C. The finished pigment showed a loss upon calcination (de-hydration) of 1.68% and the chemical composition:

| | Per cent |
|---|---|
| Lead oxide | 67.52 |
| Aluminum oxide | 30.80 |
| Combined water | 1.68 |

A small portion of the finished pigment was treated with cold water for a period of 168 hours without any discoloration, thus showing satisfactory stability.

EXAMPLE 5.—*Sub-normal lead aluminate—Approximate molecular proportions $PbO \cdot 2Al_2O_3$*

50 parts of aluminum oxide, $Al_2O_3$, which had been prepared by pre-calcining aluminum hydrate for 2 hours at 1030° C., and 50 parts of lead oxide, PbO, were wet-milled together for 3 hours and the slurry then de-watered and dried. The mixture was then calcined for 23 hours at 725° C. The calcined pigment was then wet-milled for 1 hour, the slurry allowed to stand for 11 hours and finally dewatered and dried at a temperature of 90 to 100° C. The finished pigment showed a loss upon calcination (de-hydration) of 1.22% and chemical composition:

| | Per cent |
|---|---|
| Lead oxide | 49.39 |
| Aluminum oxide | 49.39 |
| Combined water | 1.22 |

A small portion of the finished pigment was treated with cold water for a period of 168 hours. The treated product had a very slightly gray tone and after drying contained 1.82% combined water, thus showing a substantially stable pigment.

Two classes of white pigments are generally recognized: (1) the opaque white pigments, such as white lead, zinc oxide and titanium pigments which impart opacity and whiteness when mixed with oil or other organic vehicle; and (2) the extender pigments such as whiting and China clay which do not impart appreciable opacity when similarly mixed with vehicles.

The opaque pigments of class 1 are further sub-divided into two classes: (a) those which are reactive or capable of combining chemically or physico-chemically with ingredients of the vehicle, such as white lead and zinc oxide; and (b) those which are chemically inert, such as titanium pigments.

It is well known that the reactive pigments have a special value, not possessed by inert pigments, of enhancing certain desirable properties in paints and other products to which they are applied. For example, white lead has the property of combining with linseed oil and other vehicles to form a tough elastic coating which is very resistant to light and weather when spread and exposed. Zinc oxide reacts with oil and other vehicles of paint products to harden the film or coating thereby rendering it more resistant to abrasion as well as improving gloss, and when exposed is more resistant to dirt collection.

My new aluminate pigments belong to the class of opaque reactive pigments though they differ in degree of reactivity. This is quite apparent from the characteristics of paint film to be discussed later, but it is definitely indicated in the case of the basic lead aluminates by their capacity to accelerate the drying of raw linseed oil when mixed with it and spread as paint in a manner similar to the drying action of white lead. This is shown roughly in a quantitative way by the following test and results.

Mixtures of various lead aluminates and white lead carbonate were made with raw linseed oil using the same proportion of pigment to vehicle by volume. The mixtures were spread as rather thick coatings, on a steel plate as nearly as possible at the same spreading rate. The time for the films to become dry to the touch was recorded in hours as follows:

|  | Hours |
| --- | --- |
| Basic carbonate white lead | 52 |
| Normal lead aluminate | 110 |
| Basic lead aluminate ($Pb_3Al_4O_9$) | 47 |
| Basic lead aluminate ($Pb_2Al_2O_5$) | 36 |
| 50% basic lead aluminate ($Pb_2Al_2O_5$), 50% titanium pigment (Titanox B) | 48 |

From the foregoing results it should be noted that the normal lead aluminate, though accelerating the drying of linseed oil more than is the case with an inert pigment, is relatively feebly reactive, while the basic lead aluminates are more reactive than white lead. The result showing the accelerating action of basic lead aluminate when mixed with titanium pigment is particularly important from a practical application standpoint as well as strongly indicating the reactive properties of lead aluminate.

In the enumerated examples before given, no reference has been made to color since while all are white in the sense of their capacity to produce a white paint, the undertone depends much upon the calcination conditions as before explained. At lower calcination temperature normal lead aluminate has a clear white with a faint cream undertone. The cream undertone of the basic lead aluminates is slightly stronger than in the normal product.

From the foregoing properties of lead aluminate pigments, they are as a group adapted for application to oil, enamel and lacquer type paints and for other purposes where white pigments are used, such as for rubber, linoleum and other floor coverings, printing inks, vitrified enamels, etc.

In the field of paints for exterior use much investigation has been conducted for many years in an effort to combine the best features of the various opaque white pigments, but while much progress has been made, the improvement in one feature has too often been accompanied by a loss of other desirable qualities. Heretofore white lead carbonate was the only white opaque pigment which, without admixture of other pigments would make a reasonably satisfactory exterior paint with linseed oil as vehicle. Zinc oxide desirably hardens the paint film, but when used without admixture of other pigments will check and crack: admixture with white lead is the usual practice. Lithopone pigment because chemically unstable to atmospheric influences fails rapidly and is little used in high grade exterior paints. Titanium pigments are in great demand for their excellent hiding power, but fail rapidly by chalking when used alone in exterior paints. The manufacturers of paints now recommend admixture of titanium pigments with white lead, zinc oxide or both, thus improving the paint to a certain extent. However, titanium pigments with white lead and linseed oil vehicle, while durable, rapidly accumulate dirt and mildew. The addition of zinc oxide prevents dirt collection and mildew, but in a short time leads to chalking and consequent fading of tinted paints. Chalking and fading of tinted paints also occurs within a short time when mixtures of titanium pigments and zinc oxide are used with a linseed oil vehicle.

From what I have heretofore stated about lead aluminate pigments, it is evident that hiding power, being in most cases in the order of white lead in that respect, is not of special importance, though the hiding power is sufficient to make paints which will cover or hide the surface with the usual number of coats. The outstanding characteristic of lead aluminate pigments is their capacity to impart durability to paints.

I have discovered that paints made with my lead aluminate pigments ground with raw linseed oil vehicle are exceptionally durable when exposed to light and weather, retain gloss longer and do not chalk for a longer period than is the case with white lead.

I have also found that exterior paints made with mixtures of lead aluminate and titanium pigment in a raw linseed oil vehicle are remarkably durable when exposed to light and weather—being highly resistant to chalking, fading of tints, checking and cracking; they also retain their gloss very well and are free from dirt collection and mildew so as to retain clean surfaces.

The cleanness of surface and freedom from dirt collection and mildew of paints containing lead aluminates, particularly the basic lead aluminates, I attribute to the fact that the paint films dry to a harder surface compared with similar paint combinations made with white lead which dry to a film which remains slightly tacky to the touch for a long time after application.

I have furthermore discovered that a lead aluminate mixed with zinc oxide in a linseed oil paint prevents the checking and cracking which occurs when zinc oxide only is used as pigment in exterior paint. I have also found that basic lead aluminate mixed with lithopone in a linseed oil vehicle greatly improves the durability of exterior lithopone-containing paint.

For exterior paints made with mixed pigments and raw linseed oil vehicle, I prefer to have the lead aluminate about 50% of the pigment combination, but lesser amounts may be used with good results and improvement roughly proportional to the percentage used. I have also found the improvement of paints when lead aluminate is added to a plurality of pigments, either a mixture of opaque pigments or a mixture containing a colored or tinting pigment or an extender pigment which is often added to increase the pigment volume concentration or to cheapen the paint.

I have furthermore discovered that lead aluminate paints give remarkable protection to iron and steel under exposure to light, weather and other influences. This result I attribute to the reactive nature of the pigments, the lead oxide or the excess lead oxide in the basic lead aluminates functioning like free oxides of lead such as red lead which for many years has been used with linseed oil as paint where maximum protection of iron or steel is desired. Thus, for the first time, a white pigment suitable for use with linseed oil as a protective coating for iron and steel is available.

I claim as my invention:

1. The method of making an essentially pure, white, stabilized hydrated lead aluminate pigment, which consists in pre-calcining aluminum oxide at temperatures above 900° C., mixing the pre-calcined aluminum oxide and a lead compound which, upon heating, will supply to the product only lead oxide, heating the mixture in the temperature range 725° C. to 880° C. until the oxides of lead and aluminum chemically combine in the solid phase without fusion and treating the product with water to form said stabilized hydrated lead aluminate pigment.

2. The method of making an essentially pure, white, stabilized hydrated normal lead aluminate pigment, which consists in pre-calcining aluminum oxide at temperatures above 900° C., mixing the pre-calcined aluminum oxide and a lead compound which, upon heating, will supply to the product only lead oxide (PbO) in equimolecular quantity to the aluminum oxide, heating the mixture in the temperature range 725° C. to 880° C. until the oxides of lead and aluminum chemically combine in the solid phase without fusion and treating the product with water to form said stabilized hydrated lead aluminate pigment.

3. The method of making an essentially pure, white, stabilized hydrated basic lead aluminate pigment, which consists in pre-calcining aluminum oxide at temperatures above 900° C., mixing the pre-calcined aluminum oxide and a lead compound which, upon heating, will supply to the product only lead oxide (PbO) in ratios of PbO to $Al_2O_3$ greater than equimolecular, heating the mixture in the temperature range 725° C. to 880° C. until the oxides of lead and aluminum chemically combine in the solid phase without fusion and treating the product with water to form said stabilized hydrated lead aluminate pigment.

4. The method of making an essentially pure, white, stabilized hydrated subnormal lead aluminate pigment, which consists in pre-calcining aluminum oxide at temperatures above 900° C., mixing the pre-calcined aluminum oxide and a lead compound which, upon heating, will supply to the product only lead oxide (PbO) in ratios of PbO to $Al_2O_3$ less than equimolecular, heating the mixture in the temperature range 725° C. to 880° C. until the oxides of lead and aluminum chemically combine in the solid phase without fusion and treating the product with water to form said stabilized hydrated lead aluminate pigment.

5. In the method of making an essentially pure, white, stabilized, hydrated lead aluminate which consists in heating a mixture of lead and aluminum oxides until they chemically combine in the solid phase, the steps which consist in pre-calcining the aluminum oxide at temperatures above 900° C. and treating the lead aluminate pigment with water to hydrate same.

6. In the method of making an essentially pure, white, stabilized, hydrated lead aluminate which consists in heating a mixture of lead and aluminum oxides until they chemically combine in the solid phase, the steps which consist in pre-calcining the aluminum oxide in the temperature range 900 to 1300° C. and treating the lead aluminate pigment with water to hydrate same.

7. The method of making an essentially pure, white, stabilized hydrated lead aluminate pigment, which consists in pre-calcining aluminum oxide at temperatures above 900° C., mixing the pre-calcined aluminum oxide and lead oxide, heating the mixture in the temperature range 725° C. to 880° C. until the oxides of lead and aluminum chemically combine in the solid phase without fusion and treating the product with water to form said stabilized hydrated lead aluminate pigment.

8. An essentially pure, white, stabilized lead aluminate pigment containing combined water, in the preparation of which alumina precalcined at temperatures above 900° C. is chemically combined with lead oxide in the solid phase.

9. An essentially pure, white, stabilized lead aluminate pigment containing not over 5% combined water, in the preparation of which alumina precalcined at temperatures above 900° C. is chemically combined with lead oxide in the solid phase.

10. An essentially pure, white, stabilized lead aluminate pigment containing 0.25 to 2.00% combined water, in the preparation of which alumina precalcined at temperatures above 900° C. is chemically combined with lead oxide in the solid phase.

11. An essentially pure, white, stabilized normal lead aluminate pigment containing combined water, in the preparation of which alumina precalcined at temperatures above 900° C. is chemically combined with lead oxide in the solid phase.

12. An essentially pure, white, stabilized basic lead aluminate pigment containing combined water, in the preparation of which alumina precalcined at temperatures above 900° C. is chemically combined with lead oxide in the solid phase.

13. An essentially pure, white, stabilized subnormal lead aluminate pigment containing combined water, in the preparation of which alumina precalcined at temperatures above 900° C. is chemically combined with lead oxide in the solid phase.

LOUIS E. BARTON.